Jan. 20, 1942. G. E. DUNN 2,270,280
UNIVERSAL JOINT
Filed March 17, 1941
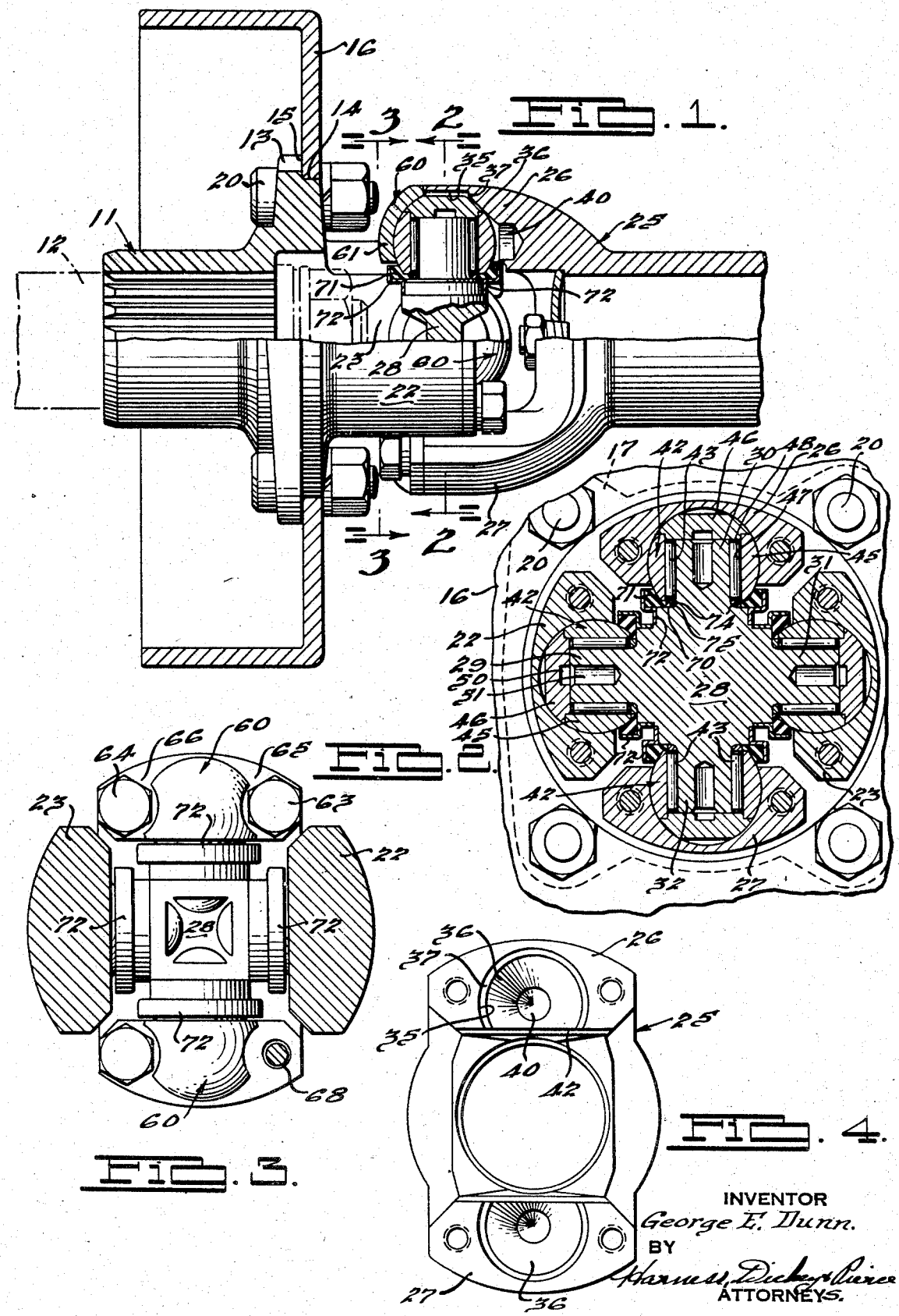
INVENTOR
George E. Dunn.
BY
ATTORNEYS.

Patented Jan. 20, 1942

2,270,280

UNITED STATES PATENT OFFICE 2,270,280

UNIVERSAL JOINT

George E. Dunn, Dearborn, Mich., assignor to Universal Products Company Incorporated, Dearborn, Mich., a corporation of Delaware Application March 17, 1941, Serial No. 383,744

5 Claims. (Cl. 64—17)

The invention relates generally to motor vehicles and it has particular relation to improvements in universal joints.

In certain respects, the invention constitutes an improvement over that embodied in my copending application, Serial No. 353,016, filed August 17, 1940.

In the mentioned copending application for patent, a universal joint is disclosed, which includes a cross having trunnions and ball members turnable thereon and a pair of yoke members having sockets for receiving the ball members. Roller bearings are employed within the balls and around the trunnions and self-alignment of the ball members enables obtaining full roller bearing contact regardless of torque conditions. This avoids localized roller bearing engagement through initial relative movement of the trunnions and yokes circumferentially of the joint axis, in the taking up of slight clearances or manufacturing tolerances and through any subsequent flexing or bending of the trunnions under torque load. Full roller bearing contact enables reducing the size of the joint since one factor governing the size of the joint is the capacity of the roller bearings to transmit torque loads and if they are subjected to localized bearing engagement, a larger roller bearing unit is required.

While alignment of the trunnions, rollers and ball members is desired, it is also desirable to have a strong yoke structure which will retain the ball members in place, which will allow assembly rapidly and without difficulty and which is not expensive to manufacture. In general, a structure such as is described above is embodied in the copending application for patent mentioned and the present invention is concerned with improvements which still further efficiency of the joint and the manufacture thereof.

One object of the present invention is to provide an improved universal joint of the general type mentioned which simplifies manufacture of the joint and reduces the cost thereof.

Another object of the invention is to provide an improved joint of the general type mentioned, wherein an improved and more efficient type of ball socket is provided.

Another object of the invention is to provide an improved universal joint having an improved seal.

Other objects of the invention will become apparent from the following specification, the drawing relating thereto, and from the claims hereinafter set forth.

For a better understanding of the invention, reference may be had to the drawing, wherein:

Figure 1 is a side elevational view, partly in cross-section, illustrating a universal joint constructed according to one form of the invention;

Fig. 2 is a cross-sectional view taken substantially along the line 2—2 of Fig. 1;

Fig. 3 is a cross-sectional view taken substantially along the line 3—3 of Fig. 1;

Fig. 4 is an end view of one of the yokes with other parts removed.

Referring to Fig. 1, the universal joint illustrated includes at the left end a hub member 11 which is keyed and locked to a shaft 12. The hub member has an annular flange 13 formed with a cylindrical seat 14 and a shoulder 15 and the surface and flange locate a brake drum 16. As best shown by Fig. 2, the flange 13 is provided with four circumferentially spaced ears 17 and these are apertured for receiving fastening bolts 20 which also pass through the web of the brake drum. Thus, the brake drum is rigidly fastened and centered on the hub 11, and it may be installed and removed from the right side of the flange 13 without interference with the universal joint presently to be described.

Again referring to Fig. 2, the flange 13 is provided with integral, diametrically opposed yoke arms 22 and 23 and since these arms are substantially identical to arms provided on the second yoke of the joint, reference may be had to the latter for details.

The second yoke of the joint is indicated at 25 and this yoke may be fastened to a torque tube or splined shaft. It includes arms 26 and 27 and these arms are associated with a cross 28 having trunnions 29, 30, 31, and 32.

Now referring also to Figs. 1 and 4, each of the arms is provided with a cylindrical recess 35 which terminates at its inner end in a conical bottom 36. This conical bottom adjacent the cylindrical surface is slightly relieved, as indicated at 37, and this facilitates grinding or finishing operations which may be employed to obtain smooth surfaces. Centrally of the recess, the conical bottom joins a smaller cylindrical opening 40. Full length conical surface is not required and by providing the relief 37 and the smaller opening 40, a sufficiently large conical bottom surface is obtained and this lessens the surface area to be finished. That part of each recess towards the joint axis is open, as indicated at 42, to allow the trunnion to project into the recess.

Each trunnion within its recess in one of the yoke arms projects into a ball member 42 and between the opening in the ball member and the outer wall of the trunnion, cylindrical rollers 43 are provided. Each of the ball members comprises two frusto spherical parts 45 and 46 and the spherical part 45 has a diametrical bore 47 extending entirely therethrough and receiving the trunnion and rollers while the spherical part 46 has a portion 48 projecting slightly into the outer end of the bore 47 and fitting closely therein. The two parts of the ball may be held together by having the portion 48 press fitted into the bore sufficiently tight to seal the bore against leakage of lubricant, and when so press fitted together, there is no danger of separation of such parts after assembly of the joints. Recesses 50 and 51 provided in the frusto spherical part 46 of the ball and in the end of the trunnion, respectively, provide a reservoir for lubricant and lubricant also is distributed throughout the bearing and particularly between the rollers 43. The ball part 46 serves as a thrust bearing member for engaging and centering the trunnion and cross and it will be observed that the outer curved parts of both ball members contact with the outer cylindrical and conical parts of the recess and thus outward movement of the ball member axially of the trunnion is prevented.

Each ball member is retained within its recess by a cap 60 having a frusto spherical socket 61 engaging the ball member. Screws or bolts 63 and 64, extending through flanges 65 and 66 on the sides of the cap, and threaded into the arm at opposite sides of the ball receiving recess, serve to secure the cap to the arm and to hold the cap against the ball. It might be noted that the openings in the flanges 65 and 66 for receiving the screws 63 and 64 are slightly larger than the diameter of the screws, as indicated at 68 in Fig. 3, so that the spherical recess in the cap may fit the ball even though the holes in the cap and in the arm should be slightly out of line or if the recess in the cap be slightly off position. In other words, the slightly larger holes permit the cap to float circumferentially a slight amount in order to ensure good fitting engagement with the ball.

For providing a seal at the inner ends of the ball member, the trunnion has a shoulder 70 which receives a sealing ring 71 formed from resilient oil resisting rubber such as synthetic neoprene. This ring has an outer surface fitting between the shoulder and the end face of the ball. It may be retained in position by means of an annular metal ferrule 72 press fitted on the cross at the base of the trunnion. Between the edge of the sealing ring and the cylindrical wall of the trunnion, an annular wear ring 74 is provided and it will be observed that this ring is disposed between the inner ends of the rollers and the shoulder 70. This ring serves to prevent inward movement of the rollers against the shoulder 70 and permits having a rounded corner 75 at the inner end of the trunnion surface while preventing possible damaging or deflecting engagement of the ends of the rollers with such rounded corner surfaces in the event the rollers should work inwardly toward the joint axis. It will be understood that the wear ring is constructed of harder metal to prevent wear by reason of the rollers moving inwardly. Provision of the rounded corner 75 at the base of the trunnion surfaces avoids a weakened condition such as would be present if a sharp corner were employed. It will be observed that although the wear ring is provided, the sealing ring 71 also is disposed between the end of the ball member and the trunnion surface 70 so that a positive compression seal is employed between these two parts. It may be mentioned here that dimension of parts and relative fits will be such as to enable obtaining a compressed sealing ring condition between the end face of the bell and the shoulder 70 and that approximate end thrust engagement between the ball and the end face of the trunnion will be likewise obtained. Slight endwise movement of the rollers is likewise permitted so that the compression seal and approximate end thrust engagement may be obtained without end engagement of the rollers with the bottom of the ball recess and the wear ring.

In use, the balls on the four trunnions are held against the conical bottoms 36 by means of the caps 60 and at the same time, the balls have side generally line contact with the sides of the cylindrical recess. While it may be said that each ball member has line contact with the conical bottom 36 and sides of the cylindrical recess, in practice, a thin or rather narrow surface contact will occur, as will be readily understood. The ball member becomes balanced on the cylindrical side of the recess so that during operation of the joint, any tendency of the ball member to move outwardly or rather along the conical surface 36, becomes balanced by the narrow surface contact along the sides of the cylindrical recess and in the plane of the trunnion axes.

In view of the fact that the ball members may shift under torque load so that the trunnions, rollers, and balls may become aligned, it is apparent that full roller bearing contact may be had at all times. This is true at the beginning of the rotation of the joint where, due to slight manufacturing clearances and tolerances, the trunnions may turn slightly about the joint axis with respect to the yoke arm. When this occurs, slight clearances in the roller bearing result in the trunnion having localized bearing contact with the outer ends of the rollers, but as soon as this localized pressure occurs, the ball member can shift to obtain larger roller bearing contact. As the torque load increases, the ball members will shift to accommodate themselves to the position of the trunnion even though the latter flexes or bends and a full length roller bearing contact can obtain to take the torque load. Full roller bearing contact enables using a joint of smaller over-all size, and this results in less weight, lower cost, and less turbulence in the propeller shaft from out-of-balance conditions. Generally, the rollers and trunnions may be made shorter, the ball members may be located closer to the axis of the joint, the yoke arms may be disposed closer to the axis of the joint, and, therefore, the general over-all diameter of the joint may be smaller. Again, rollers of smaller diameter may be used and the diameter of the trunnions may be accordingly increased, and thus a stronger and shorter trunnion nearer to the joint axis may be used. Moreover, constructing the joint in accordance with the present invention facilitates manufacturing operations since the cylindrical recess and conical bottom may be formed easily and by machine operations which naturally may be co-related to place the axes of the recesses in proper relation to the joint axis. The cap 60 may be made from a sheet metal stamping as will be readily understood.

With respect to the wear ring 74 and associated sealing means, this matter is disclosed and claimed in a separate application for patent, Serial No. 396,647, filed June 5, 1941. Also, with respect to the two part ball structure, this matter is disclosed and claimed in a separate application for patent, Serial No. 395,213, filed May 26, 1941.

Although only one form of the invention has been described and illustrated in detail, it will be apparent to those skilled in the art that various modifications may be made without departing from the spirit of the invention.

What is claimed is:

1. In a universal joint of the four trunnion type, a trunnion bearing assembly comprising a member having a recess of substantially cylindrical character extending longitudinally of the joint axis and which is open at one end and which terminates in a bottom surface adapted to engage a ball, that side of the member next to the joint axis having a slot which opens to the recess, a trunnion projecting through the slot and into the recess, a ball member disposed in the recess and having an opening receiving the trunnion, and a second member releasably fastened on the first member over the open end of the recess and holding the ball against the bottom surface of the recess, the cylindrical part of said recess extending longitudinally beyond both sides of the ball center so that a portion of said cylindrical part is between the bottom surface and the ball center.

2. In a universal joint of the four trunnion type, a trunnion bearing assembly comprising a member having a recess of substantially cylindrical character extending longitudinally of the joint axis and which is open at one end and which terminates in a conical bottom adapted to engage a ball, that side of the member next to the joint axis having a slot which opens to the recess, a trunnion projecting through the slot and into the recess, a ball member disposed in the recess and having an opening receiving the trunnion, and a second member releasably fastened on the first member over the open end of the recess and holding the ball against the conical bottom of the recess.

3. In a universal joint of the four trunnion type, a trunnion bearing assembly comprising a member having a recess of substantially cylindrical character extending longitudinally of the joint axis and which is open at one end and which terminates in a conical bottom adapted to engage a ball, that side of the member next to the joint axis having a slot which opens to the recess, a trunnion projecting through the slot and into the recess, a ball member disposed in the recess and having an opening receiving the trunnion, and a second member releasably fastened on the first member over the open end of the recess and holding the ball against the conical bottom of the recess, the cylindrical part of the recess extending longitudinally beyond both sides of the ball center.

4. In a universal joint of the four trunnion type, including a pair of yokes each having a pair of arms, each arm having a recess of cylindrical character extending from its free end and terminating inwardly in a conical bottom adapted to engage a ball, that face of the arm next to the joint having a slot which opens to the recess, a cross having trunnions respectively projecting through the slots and into the recesses, a ball member in each recess and having a diametrical opening receiving the trunnion, the ball being of substantially the same diameter as the cylindrical part of the recess and being seated against the cylindrical side and conical bottom of the recess, and a cap releasably fastened on the free end of the arm and contacting the ball.

5. In a universal joint of the four trunnion type, including a pair of yokes each having a pair of arms, each arm having a recess of cylindrical character extending from its free end and terminating inwardly in a conical bottom adapted to engage a ball, that face of the arm next to the joint having a slot which opens to the recess, a cross having trunnions respectively projecting through the slots and into the recesses, a ball member in each recess and having a diametrical opening receiving the trunnion, the ball being of substantially the same diameter as the cylindrical part of the recess and being seated against the cylindrical side and conical bottom of the recess, and a cap releasably fastened on the free end of the arm and contacting the ball, the cap and recess forming a closed receptacle for the ball outwardly of the center of the latter.

GEORGE E. DUNN.